United States Patent [19]

Ewen

[11] Patent Number: 4,761,024
[45] Date of Patent: Aug. 2, 1988

[54] CLAMP ASSEMBLY

[75] Inventor: Alexander T. E. Ewen, Nazing, Great Britain

[73] Assignee: Glynwed Tubes & Fitting Limited, Great Britain

[21] Appl. No.: 919,847

[22] Filed: Oct. 16, 1986

[30] Foreign Application Priority Data

Oct. 16, 1985 [GB] United Kingdom ............... 8525434

[51] Int. Cl.$^4$ .............................................. F16L 41/00
[52] U.S. Cl. ...................................... 285/93; 137/318; 285/21; 285/197
[58] Field of Search ................. 285/197, 198, 199, 93, 285/21; 137/318, 316, 317

[56] References Cited

U.S. PATENT DOCUMENTS

| | | | |
|---|---|---|---|
| 578,418 | 3/1897 | Payne | 137/318 |
| 951,519 | 3/1910 | Bacigalupi | 285/197 X |
| 970,348 | 9/1910 | Osborne | 137/316 |
| 1,039,827 | 10/1912 | Sharp | 137/318 |
| 1,590,186 | 6/1926 | Fanselow | 137/318 |
| 4,216,793 | 8/1980 | Volgstadt et al. | 137/318 |
| 4,494,780 | 1/1985 | Burnett | 285/199 X |
| 4,516,593 | 5/1985 | Moto | 285/197 |
| 4,606,558 | 8/1986 | Davidson | 285/197 X |

Primary Examiner—Thomas F. Callaghan

[57] ABSTRACT

A clamp assembly for temporarily clamping a tapping tee saddle 1 to a pipe 9 has a platform 2 and a pressure member 32 which is connected to the platform by a rod 24 slidable in a screw shaft 16, the shaft 16 being screw adjustable relative to the platform 2. A compression spring 40 is provided between the pressure member 32 and the shaft 16. Flexible straps 54 are connected to the platform 2 to extend around the pipe 9 for clamping the assembly to hold the saddle on the pipe. Clamping pressure is provided by screw adjustment of the shaft 16 in the platform 2 to compress the spring 40 between the member 32 and shaft 16 and a consequent reaction against the straps 54. During adjustment of the shaft 16, the rod 24 is displaced relative thereto and its position in the shaft 16 provides an indication of the clamping pressure which is exerted on the saddle 1.

15 Claims, 5 Drawing Sheets

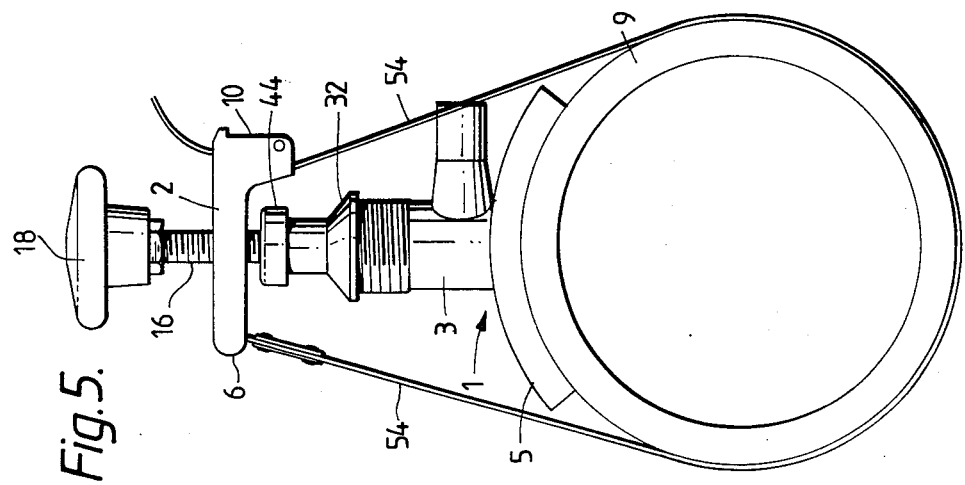
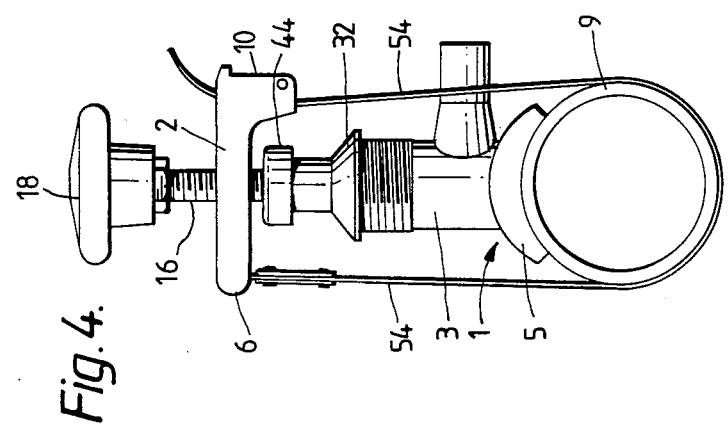

CLAMP ASSEMBLY

TECHNICAL FIELD & BACKGROUND ART

The present invention relates to a clamp assembly for temporarily clamping a tapping tee saddle to a pipe during fixing of the saddle to the pipe.

In FIG. 1 of the accompanying drawings there is shown a perspective view of a tapping tee saddle 1 connected to a pipe 9. A tapping tee saddle is used for connecting two pipes of plastics material at an angle to one another. The saddle is particularly suitable for connecting together pipes intended to carry a fluid such as, for example, pipes forming part of a gas or water main system. The tapping tee saddle 1 includes a tubular body 3 extending from a plastics pad 5, and a branch pipe 7 which extends from the body 3. The pad 5 is of concave or saddle shape to sit on the pipe 9. In the case of a gas or water main, the pipe 9 will usually be the main pipe and the branch pipe 7 leads to a consumer point such as a house. The pad 5 and the main pipe 9 have to be heated in order that their plastics material may be fused or welded together to connect the tapping tee saddle 1 to the pipe 9. It is important that the saddle 1 and the pipe 9 remain pressed together during the fusing operation and hitherto the necessary pressure has been provided by various clamping devices. Previously known clamping devices present the problem that a particular clamp is suitable for use only with a main pipe 9 of a particular diameter. In addition, some known clamps do not exert their clamping pressure along the longitudinal axis of the tubular body 3, and this can cause problems of distortion and lead to inefficient fusion or welding.

STATEMENT OF INVENTION & ADVANTAGES

It is an aim of the present invention to alleviate the problems of known clamps, and accordingly there is provided a clamp assembly for temporarily clamping a tapping tee saddle to a pipe, said assembly comprising a platform, a pressure member connected to the platform, flexible retaining means for extending around a portion of the pipe opposite to the tapping tee saddle and to be secured to the platform to retain the pressure member on the tapping tee saddle, and control means which is adjustable relative to the platform for exerting clamping pressure in an axial direction on the tapping tee saddle through the pressure member by reaction against the flexible retaining means.

By the present invention the flexible retaining means, which is preferably in the form of one or more straps, can be of any desired length so that the clamp assembly can be used with a wide range of diameters of pipe which the retaining means has to accommodate during fusion or welding of a tapping tee saddle to the pipe. Preferably the flexible retaining means is symmetrically disposed relative to the said axial direction in which the clamping pressure is applied so that the clamping pressure on the saddle is substantially uniformly disposed over the contacting faces which are to be fused together and an efficient weld can thereby be achieved.

Preferably the pressure member is axially displaceable against spring means relative to the control means; the spring means is intended to react between the control means and the pressure member for exerting pressure in the axial direction on the tapping tee saddle as the control means, which is conveniently in the form of a screw threaded shaft in the platform, is adjusted relative to the platform.

It is also preferred that indicating means is provided in the assembly to provide an indication of when a desired clamping pressure is being exerted on the tapping tee saddle. Conveniently the indicating means comprises a component which is displaceable with the pressure member where such pressure member is spring loaded relative to the control means as mentioned above so that, when the component attains a predetermined position relative to the control means, that position of the component is indicative of a required clamping pressure being exerted.

DRAWINGS

One embodiment of a clamp assembly constructed in accordance with the present invention will now be described, by way of example only, with reference to the accompanying drawings in which:

FIGS. 4 to 6 are diagrammatic side views of the clamp assembly of FIGS. 2 and 3 in use with main pipes of different diameters.

DETAILED DESCRIPTION OF DRAWINGS

Figure 1:
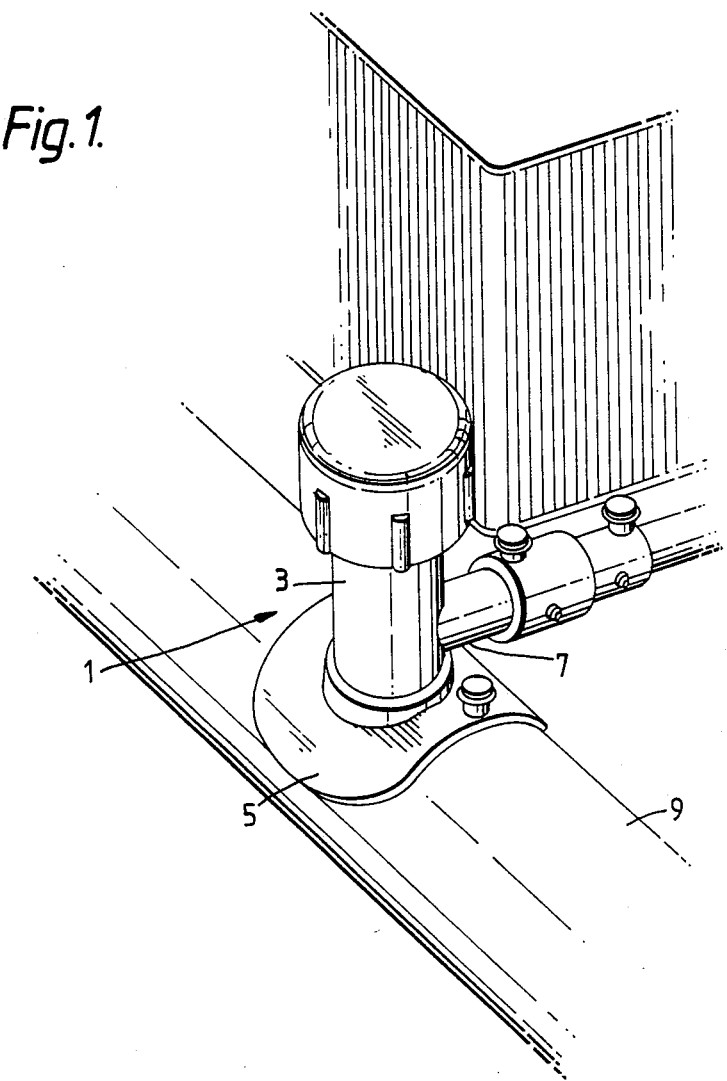
FIG. 1 is a diagramatic perspective view of a portion of a main pipe and an associated tapping tee saddle.

The clamp assembly for a tapping tee saddle 1 includes a platform 2 which may be regarded as generally rectangular and has four brackets 4, 6, 8 and 10 located at the corner regions of the rectangle. A screw-threaded passage 12 extends through the centre of the platform 2, and rods 14 extend across the brackets 4 and 6.

An externally screw-threaded tubular shaft 16 is in screw-threaded engagement with the passage 12, and extends through the platform 2. A handle 18 is secured to the upper end of the shaft 16, and a passage 20 extends partway through the centre of the handle 18 coaxial with the shaft 16. The passage 20 is of slightly greater diameter than the shaft 16 whereby the upper edge of the shaft 16 constitutes a shoulder 22.

A rod 24, having a head 26 at its upper end, makes a sliding fit in the shaft 16 with the head 26 resting on the shoulder 22. The rod 24 extends beyond the lower end of the shaft 16, and a recess 28 is formed in the bottom portion of the rod 24 to define a seat 30.

A pressure head 32 is secured to the bottom portion of the rod 24 by means of a circlip 33. The head 32 includes a forward nose 34 dimensioned to make a sliding fit in a recess 36 in a pipe cutter 38 which forms part of the saddle 1 and is in screw threaded engagement with the bore of the body 3. A central passage 40, having a bottom face 42, extends into the upper portion of the head 32, and a cup 44 makes a sliding fit on the rod 24 to abut the lower end of the threaded shaft 16. A compression spring 46 extends between the bottom face 42 and the cup 44. A seal washer 48 is located on the nose 34.

Clamp means in the form of a catch member 50, having a cam face 52, is pivotally mounted in each of the brackets 8 and 10. Two flexible straps 54 are to be connected, one each, from a respective bracket 4, 6 to the bracket 8, 10 which respectively and directly opposes the bracket 4 or 6. For this purpose each strap 54 is attached at one end to a clip 56 dimensioned to clip over the respective rod 14 in the bracket 4 or 6. The other end of each strap 54 can be passed between the cam face 52 and the platform 2 in the respective bracket 8 or 10 when the catch member 50 is in the open position. On pivoting the catch members 50 to their closed position the straps 54 are clamped between the cam faces 52 and the platform 2.

In use of the clamp assembly, the nose 34 is mated with the recess 36 of the pipe cutter 38 and the saddle is positioned on the pipe 9 to which it is to be joined. The two straps 54 are clipped at one end onto the rods 14, one in each of the brackets 4 and 6. The handle 18 is rotated to withdraw the head 32 towards the platform 2 (while the head nose 34 is located in the recess 36 in the cutter 38). The two straps 54 are placed, substantially parallel to each other, around or beneath the lower portion of the pipe 9, passed through their respective brackets 8 and 10, pulled tight and then clamped by the catch members 50 as previously described.

The handle 18 is now rotated to advance the shaft 16 towards the tapping tee saddle 1, thereby causing the cup 44 to compress the spring 46. This spring compression reacts against the straps 54 to cause the head 32 to exert pressure on the saddle body 3; the greater the spring compression the greater the force exerted. When the handle 18 is in its withdrawn position the rod head 26 is located inside the handle 18. As the shaft 16 advances, thereby increasing the clamping pressure on the saddle and pipe, the head 26 moves towards or beyond the upper surface of the handle 18. This embodiment is preferably designed so that when the required clamping pressure is exerted on the saddle and pipe, the top of the head 26 is flush with the upper surface of the handle 18. It is to be understood that any selected relative position of the handle 18 and head 26 can be adopted as a means of indicating that the required clamping pressure has been obtained. The straps 54 are disposed symmetrically on opposite sides of the axis of the shaft 16 so that a uniform and symmetrical clamping pressure is provided along the axis of the body 3. When the required clamping pressure has been reached, the saddle is fused to the pipe, and the clamping pressure is maintained until fusion has been completed. The catch members 50 are then pivoted to release the straps 54, and the clamp is removed from the fused saddle and pipe.

The straps 54 can be made of any suitable material such as for example a tough webbing material. Any suitable number of straps can be used, and the invention is not restricted to two straps although the straps should be disposed to ensure that a uniform clamping pressure is applied along the axis of the body 3.

Conveniently, platform 2 is made of aluminium, the shaft 16 is made of stainless steel, and the other components are made of cadmium plated mild steel.

An internally threaded cadmium plated mild steel insert 62 is located in the platform 2 so as to be in screw threaded engagement with the shaft 16.

Figure 2:
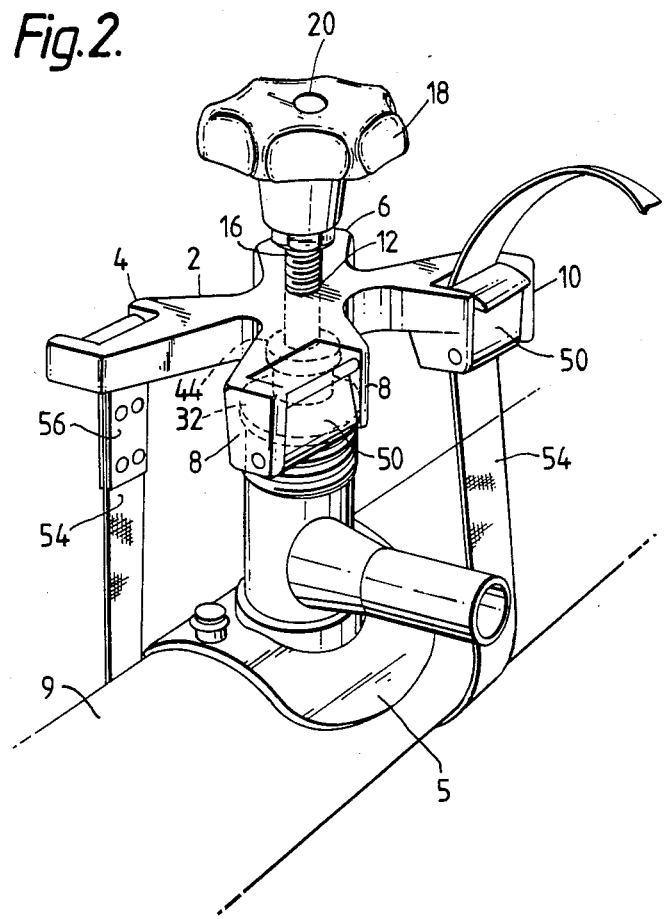
FIG. 2 is a diagrammatic perspective view of part of the clamp assembly fitted to a tapping tee saddle and main pipe.
Figure 3:
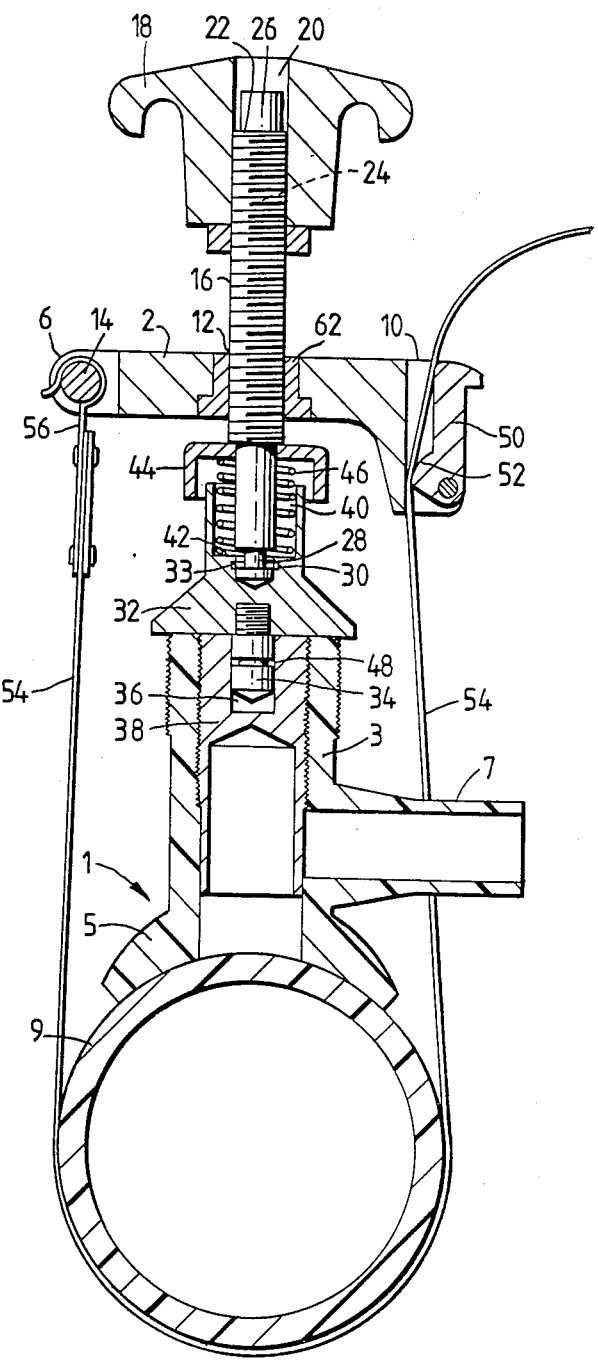
FIG. 3 is a side sectional view of the assembly in FIG. 1.
Figure 6:
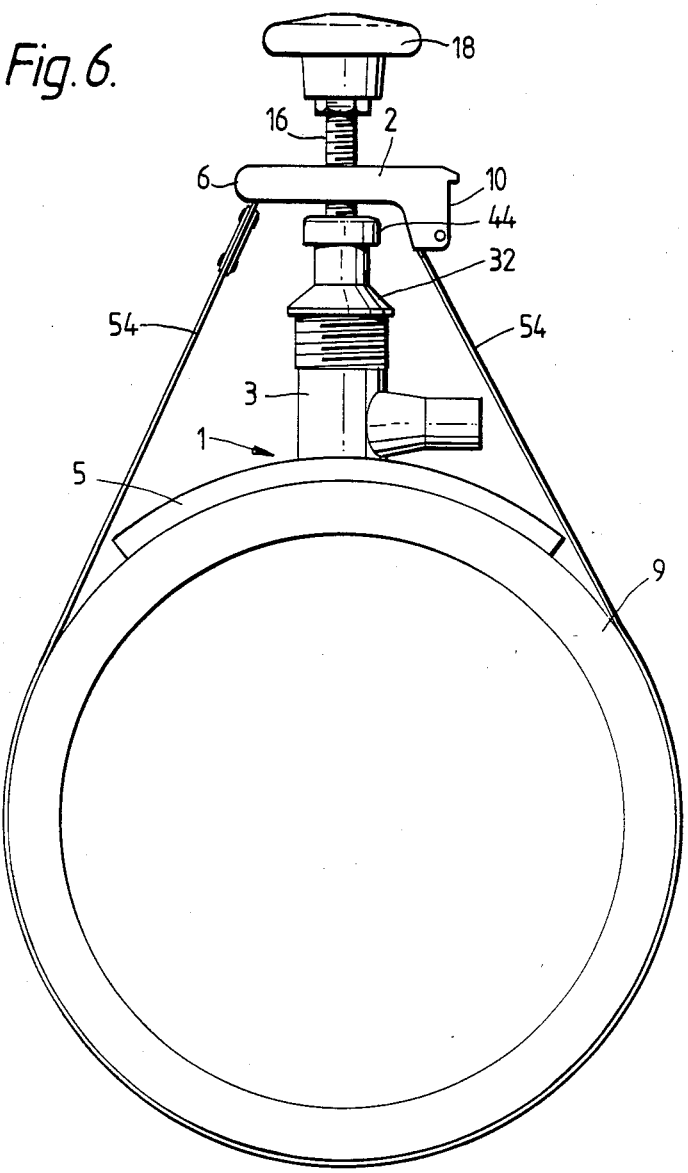

As will be apparent from FIGS. 4 to 6, the clamp assembly shown in FIGS. 2 and 3 can be utilised for temporarily holding saddles for fusing to a wide range of diameters for the main pipe 9.

Figure 7:
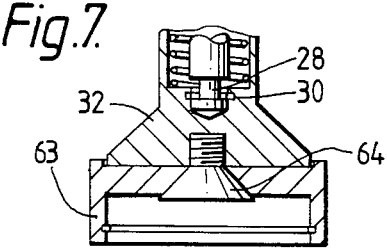
FIG. 7 is a side sectional elevation of a modification to the clamp assembly.

The clamp assembly of the invention can be modified to provide other means of contacting the saddle body 3. For example, in the modification shown in FIG. 7, the nose 34 is replaced by a cup 63 mounted on the head 32 by a countersunk screw 64. An O-ring 66 is located inside the cup 63 which is dimensioned to fit over the top of the body 3. In operation, the cup 63 is placed over the top of the body 3 and the clamping pressure is applied as previously described.

What is claimed is:

1. A clamp assembly for temporarily clamping a tapping tee saddle to a pipe, said assembly comprising a platform, a pressure member connected to the platform, flexible retaining means for extending around a portion of the pipe opposite to the tapping tee saddle and to be secured to the platform to retain the pressure member on the tapping tee saddle, control means which is adjustable relative to the platform for exerting clamping pressure in an axial direction on the tapping tee saddle through the pressure member by reaction against the flexible retaining means, and indicating means for indicating when a desired clamping pressure is being exerted on the tapping tee saddle.

2. An assembly as claimed in claim 1 in which the control means comprises a screw threaded shaft coaxial with said axial direction and which screw threadedly engages the platform to be axially adjustable relative thereto.

3. An assembly as claimed in claim 1 in which the flexible retaining means is symmetrically disposed relative to said axial direction.

4. An assembly as claimed in claim 1 in which the retaining means comprise at least two flexible straps.

5. An assembly as claimed in claim 1 in which the platform carries clamp means by which the flexible retaining means can be selectively released therefrom or secured thereto.

6. An assembly as claimed in claim 5 in which the clamp means comprises at least one catch member pivotally mounted on the platform and having a cam surface which is selectively engageable with the flexible retaining means to secure the retaining means to the platform.

7. An assembly as claimed in claim 1 in which the pressure member is axially displaceable against spring means relative to said control means, said spring means reacting between the control means and pressure member for exerting pressure in the axial direction on the tapping tee saddle.

8. An assembly as claimed in claim 7 in which the spring means comprises a compression spring mounted between the pressure member and the control means and coaxial with said axial direction.

9. An assembly as claimed in claim 7 in which the pressure member has a component which is displaceable therewith and relative to a predetermined position on the control means which position of said component is indicative of a desired clamping pressure being exerted on the tapping tee saddle.

10. An assembly as claimed in claim 9 in which the component comprises a rod which is co-axial with said axial direction and extends from the pressure member, said rod being displaceable relative to the control means and having a predetermined position relative to the control means which is indicative of said desired clamping pressure.

11. An assembly as claimed in claim 10 in which the control means comprises a tubular screw threaded shaft which is co-axial with said axial direction and which screw threadedly engages the platform to be axially adjustable relative thereto and wherein said rod is axially slidably received in said tubular shaft.

12. An assembly as claimed in claim 1 in which the pressure member has a nose which is co-axial with said axial direction and which is intended to be received in a recess in the tapping tee saddle when the assembly is mounted on the saddle.

13. An assembly as claimed in claim 1 in which the pressure member has a cup co-axial with said axial direction and within which cup part of the tapping tee saddle is received when the assembly is mounted on the saddle.

14. A plastic main pipe and a clamp assembly for temporarily clamping a plastic tapping tee saddle to the pipe, said assembly comprising a platform, a pressure member connected to the platform, flexible retaining means for extending around a portion of the pipe opposite to the tapping tee saddle and to be secured to the platform to retain the pressure member on the tapping tee saddle, control means which is adjustable relative to the platform for exerting clamping pressure in an axial direction on the tapping tee saddle through the pressure member by reaction against the flexible retaining means, and indicating means for indicating when a desired clamping pressure is being exerted on the tapping tee saddle.

15. A clamp assembly for temporarily clamping a tapping tee saddle to a pipe, said assembly comprising a platform, a pressure member connected to the platform, flexible retaining means for extending around a portion of the pipe opposite to the tapping tee saddle and to be secured to the platform to retain the pressure member on the tapping tee saddle, control means which is adjustable relative to the platform for exerting clamping pressure in an axial direction on the tapping tee saddle through the pressure member by reaction against the flexible retaining means, said pressure member being axially displaceable against spring means relative to said control means, said spring means reacting between the control means and pressure member for exerting pressure in the axial direction on the tapping tee saddle, and said pressure member including a rod co-axial with said axial direction and extending from the pressure member and which is displaceable therewith and relative to a predetermined position on the control means which position of said rod is indicative of a desired clamping pressure being exerted on the tapping tee saddle, and said control means including a tubular screw threaded shaft which is co-axial with said axial direction and which screw threadedly engages the platform to be axially adjustable relative thereto, and said rod being axially slidably received in said tubular shaft.

* * * * *